(12) United States Patent
Dannhauer et al.

(10) Patent No.: US 7,275,443 B2
(45) Date of Patent: Oct. 2, 2007

(54) PRESSURE AND DIFFERENTIAL PRESSURE GAUGE WITH OVERLOAD PROTECTION

(75) Inventors: Wolfgang Dannhauer, Teltow (DE); Dietfried Burczyk, Teltow (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/537,343

(22) PCT Filed: Dec. 2, 2003

(86) PCT No.: PCT/EP03/13541

§ 371 (c)(1),
(2), (4) Date: Dec. 12, 2005

(87) PCT Pub. No.: WO2004/051208

PCT Pub. Date: Jun. 17, 2004

(65) Prior Publication Data

US 2006/0150741 A1  Jul. 13, 2006

(30) Foreign Application Priority Data

Dec. 5, 2002  (DE) .............................. 102 57 124

(51) Int. Cl.
*G01L 13/02* (2006.01)

(52) U.S. Cl. .......................................... 73/716; 73/736
(58) Field of Classification Search .................. 73/716, 73/736
See application file for complete search history.

(56) References Cited

U.S. PATENT DOCUMENTS

| | | | |
|---|---|---|---|
| 3,738,343 A * | 6/1973 | Zeyns et al. ................. 123/465 |
| 6,705,169 B2 * | 3/2004 | Textor .......................... 73/715 |
| 7,021,149 B2 * | 4/2006 | Dannhauer et al. ........... 73/716 |

* cited by examiner

*Primary Examiner*—Andre J. Allen
(74) *Attorney, Agent, or Firm*—Bacon & Thomas, PLLC

(57) ABSTRACT

A pressure pickup, having a pressure chamber, which is located between a separating membrane and a platform. A pressure canal for hydraulic transmission of pressure to a measuring cell, includes, for dynamic overload protection, a Venturi throttle implemented by providing that the pressure canal has at least one segment whose flow cross section is variable. Such segment is preferably provided in the form of an annular canal. The flow cross section can be changed, for example, by an axial shifting of a conical inner wall relative to a complementary, conical outer wall, or by the deforming of an elastic inner or outer wall of the annular canal.

13 Claims, 2 Drawing Sheets

PRESSURE AND DIFFERENTIAL PRESSURE GAUGE WITH OVERLOAD PROTECTION

FIELD OF THE INVENTION

The present invention relates to pressure, and pressure-difference, measuring devices utilizing a hydraulic measuring system, particularly a system involving a hydraulic separating member.

BACKGROUND OF THE INVENTION

In such measuring devices, a separating membrane, or diaphragm, is loaded with the pressure to be measured, with the separating membrane transferring the pressure to a hydraulic medium. Via a suitable canal system, the hydraulic medium conducts the pressure to a sensor element, or elemental sensor, with this elemental sensor having a pressure-sensitive element, especially a measuring membrane, which is loaded with the pressure.

For protection against static overloadings of the measuring element, an overload membrane is usually provided. This has a sufficiently large hydraulic capacity that it can fully absorb, in the case of an overloading, the transfer medium forced by the separating membrane out of the pressure chamber. The mechanical overload system has an internal inertia, and rapid, dynamic pressure surges are sometimes incompletely intercepted.

An object of the present invention, therefore, is to provide an overload protection which intercepts and curtails rapid, dynamic overloads. This object is achieved, according to the invention, by the pressure pickup defined in independent patent claim 1.

The pressure sensor of the invention includes a separating membrane and a platform, with the separating membrane being secured pressure-tightly to the platform, such that a pressure chamber is formed between the platform and the separating membrane. A pressure canal extends from the pressure chamber. The pressure canal has a segment of variable flow cross section.

The segment of the pressure canal with variable flow cross section can be provided at any position, with especially the entry region of the pressure canal, that is, the region which connects directly to the pressure chamber, being presently preferred.

The segment of the pressure canal with the variable flow cross section can especially be formed as an annular canal, with a wall of the segment preferably being formed symmetrically about an axis, and having a diameter which changes monotonically in the axial direction. The second wall of the segment is complementary to the first wall of the annular canal. The first and second walls of the annular canal can especially be formed as lateral surfaces of truncated cones. An alteration of the flow cross section can thereby occur, for example, when the second wall is shifted on axis with respect to the first wall, such that the separation distance between the first wall and the second wall changes.

The first wall of the annular canal can be formed, for example, in the entry region of the pressure canal, by a conical widening toward the pressure chamber. In this case, the second wall of the annular canal is formed by a projection of the separating membrane, which is formed by embossing the separating membrane against the platform.

When the separating membrane, during measuring operation, approaches the platform due to pressure loading, the annular gap between the first and second walls of the annular canal narrows such that its flow cross section decreases.

An annular canal with a variable flow cross section can additionally be realized by providing the pressure canal with, at any position, a segment with a conical outer wall, and arranging in the canal an axially movable filler with a complementary conical lateral surface. Optionally, the filler can be held in a position of equilibrium with an elastic element, for example a spring.

Lastly, the canal can preferably have a narrowed segment with an elastically deformable wall. The elastically deformable wall can, for example, be embodied in the outer wall. In this case, this segment is preferably loadable from the outside with the pressure in the pressure chamber. The narrowing can be conveniently formed by an appropriate configuration of the equilibrium position of the of the elastic segment in the outer wall. Similarly, the narrowing can be realized by a filler, which is arranged coaxially in the canal, and which has a radial widening in the area of the elastic segment, for example in the form of a flow body having a teardrop profile.

In an alternative embodiment, the narrowing, as well as the elastic wall, are provided in an axial segment of a filler, which is arranged coaxially in the canal, with the elastic wall forming the inner wall of an annular canal. Preferably, the filler has an interior space, which, at least sectionally, is defined by the elastic wall. The interior space communicates with the canal via an opening, such that the static pressure in the canal is equal to that in the interior space.

The embodiment of the segment with the variable flow cross section as annular canal, for example by means of a filler, offers the advantage that, in the case of variants having an elastic wall, a relatively great change of the flow cross section can occur due to relatively small changes of the radius of the elastic wall. In this way, even in the case of embodiments with elastic wall segments, a nearly complete closure of the segment of variable flow cross section is possible.

The overload protection of the pressure pickup of the invention functions according to the following principle: When the pressure pickup is loaded with a pressure to be measured, small amounts of the hydraulic transfer liquid are displaced from the pressure chamber into the pressure canal, in order to transfer the pressure from there to a measuring cell. Here, in the case of pressure fluctuations in the normal measuring range, this amounts only to relatively low flow velocities. However, when rapid pressure shocks occur, the flow velocity greatly increases, such that the pressure in the pressure canal is diminished by $\rho*v2/2$, with v being the velocity of the transfer medium, and $\rho$ its density. However, the sinking of the pressure in the pressure canal leads to the variable wall of the pressure canal being drawn inward, whereby the flow resistance in the canal increases. Through this, the pressure measuring cell is protected from rapid pressure shocks due to overloading. In so far as the reduction of the cross-sectional surface requires a higher flow velocity in order to carry the transfer liquid through the bottleneck in the pressure canal, this involves a new pressure reduction and further drawing-in of the canal wall, such that the canal can ultimately be completely closed.

The effectiveness of this overloading protection according to the Venturi principle is illustrated in FIG. 3, which shows the chronological behavior of pressure and a corresponding sensor signal for pressure changes in the measuring range and in the case of overloading. Here, the sensor signal S is, in each case, a measure of how well pressure was transferred through the pressure canal to the sensor. $P_2$ shows a typical pressure increase, as it can occur in an industrial process, with the sensor signal $S_2$ following the chronological behavior of the pressure comparatively rapidly. $P_1$ shows the rising edge of a pressure shock due to overloading, which greatly exceeds the scale of the graph. On the basis of the high velocities which occur in the pressure canal, a negative pressure is generated there, such that the variable canal wall constricts, or closes, the flow cross section so much that the pressure shock cannot be transferred to the sensor, and the sensor signal $S_1$ only very slowly follows the behavior of the pressure.

The term "pressure pickup", in connection with the present invention, includes, on the one hand, simple diaphragm seals, which can, for example, be connected to a sensor or transmitter via a capillary line, and, on the other hand, to complete measuring systems with integrated pressure measuring cells.

BRIEF DESCRIPTION OF THE DRAWINGS

Further advantages and aspects of the invention will be apparent from the dependent claims, the following descriptions of examples of embodiments, and the drawings, the figures of which show as follows:

DESCRIPTION OF THE PREFERRED EMBODIMENTS

Figure 1:
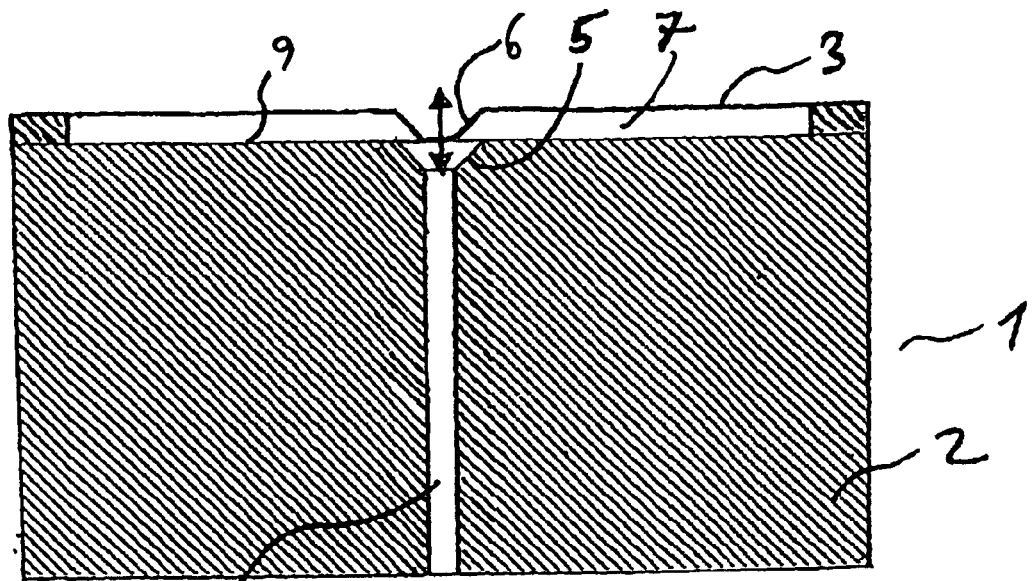
FIG. 1 a section through a first example of an embodiment of a pressure sensor in accordance with the invention.

The pressure pickup 1 shown in FIG. 1 includes a platform 2, having, preferably, a cylindrical geometry.

On a first face of the platform, a separating membrane 3 is secured with its edge in such a way that a pressure chamber 7 is formed between the platform and the separating membrane. Extending from the pressure chamber is a pressure canal 4, through which the pressure, with which the separating membrane 3 has been loaded, is transferred to a measuring cell by means of a hydraulic transfer liquid, especially a silicone oil. Separating membranes usually are formed to undulate in the manner of concentric wave trains, in order to enable adequate membrane stroke. For producing this wave structure, the membrane bed 9 in the front face of the platform 1 can, for example, have a corresponding wave structure, with the separating membrane 3 being embossed against the membrane bed 9, after its securement to the platform 1. In so far as the details of this wave structure do not pertain to the present invention, it is not illustrated in the examples of embodiments.

The pressure canal 4 includes in its entry region a widening having a lateral surface 5 in the shape of a truncated cone. The separating membrane has, complementary to the widening 5, a projection 6 which, for example, is formed by embossing the separating membrane against the face of the platform. In the equilibrium position, that is, when the separating membrane is not loaded with pressure, or in the case of low pressure loading in the measuring range, the cross-sectional area of the entry of the pressure canal is hardly restricted by the projection 6. However, when a greater pressure loading occurs, the conical projection 6 is shifted into the entry region, and a narrow, annular gap with a reduced cross-sectional area is produced, through which the transfer liquid is pressed with greater velocity. This in turn leads to a drawing-in of the projection 6, whose lateral surface serves as the inner wall of the annular gap, to the oppositely lying, outer wall 5 of the annular gap, on the basis of the Venturi effect. In this way, a pressure measuring cell connected to the pressure canal 4 is protected from destruction by rapid pressure shocks. A truncated cone with a maximum diameter of 1.5 mm and minimum diameter of 0.8 mm has proven advantageous. The height of the cone amounts to 1.5 mm. In the case of dynamic overloading, the hydraulic resistance of the Venturi canal in the region of the separating membrane should correspond to 90% of the total hydraulic resistance.

Figure 2:
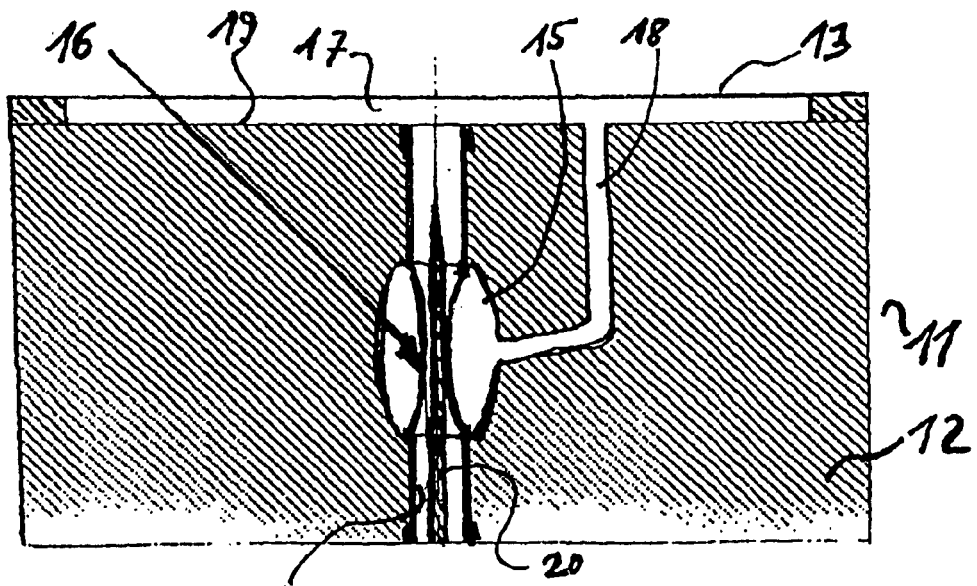
FIG. 2 a section through a second example of an embodiment of a pressure sensor in accordance with the invention.
Figure 3:
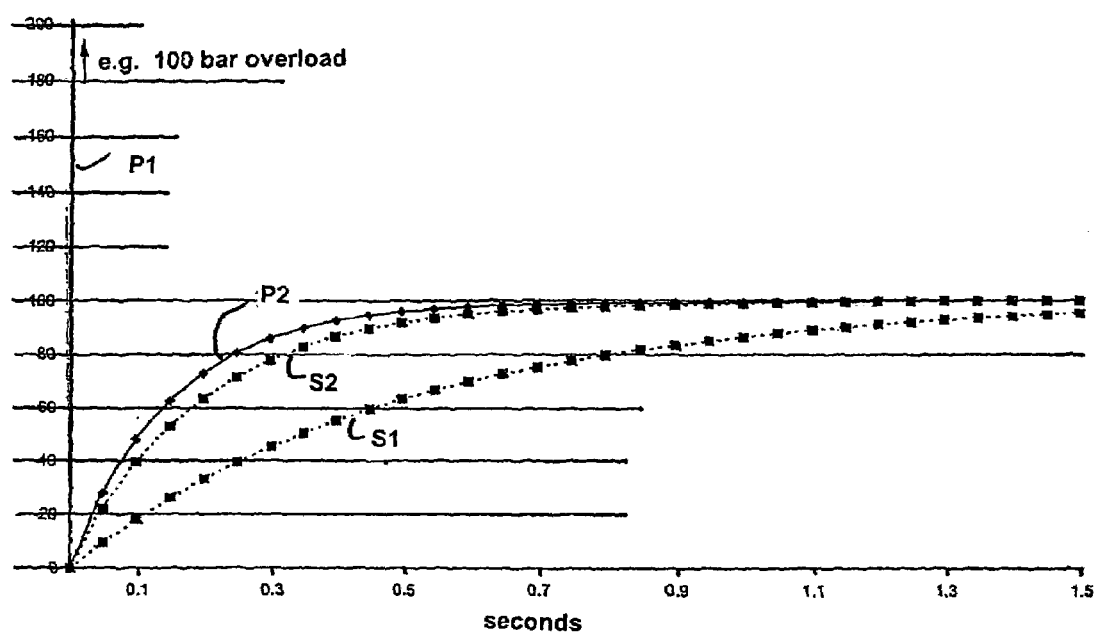
FIG. 3 chronological behavior of pressure and corresponding sensor signal for a pressure pickup in accordance with the invention, both in the measuring range and in the case of overloading.

FIG. 2 shows a longitudinal section through a second form of embodiment, with the pressure pickup 11 having essentially the same basic structure as the previously described pressure pickup. Only the overloading protection according to the Venturi principle is structured differently. In this case, the pressure canal 14 comprises a pipe, which is set in a corresponding bore in the platform 12, and, in its end regions, is welded to the platform. The pipe 14 includes a narrowed segment with a constriction 16, in which the pipe wall is radially flexible. The constriction 16 aligns axially with an annular cavity, which is formed in the bore of the platform 12, such that between the constriction and the cavity a ring-chamber 15 is formed, which surrounds the pipe 14. The ring chamber 15 communicates via a ring-chamber canal 18 with the pressure chamber 17 formed between the separating membrane 13 and the platform 12. In the case of equilibrium, that is, when the transfer medium is not flowing, equal pressure prevails in the ring chamber 15 and in the canal 14. Under these conditions, the pipe wall in the area of the constriction is also in its equilibrium position, such that the cross-sectional area of the pressure canal is large enough allow the transfer medium to flow when it has a slow velocity. When, in the case of pressure shocks, the velocity of the transfer liquid in the area of the constriction increases, the elastic outer wall of the pipe 14 is drawn inward on the basis of the Venturi effect, whereby the cross-section of the pipe can be constricted until closure.

Naturally, in the configuration of the constrictions, various alternatives are possible. For example, a filler 20 can be inserted into the pressure canal 14, such that in the area of the constriction 16 an annular canal is produced, whose inner wall is defined by the filler 20, and whose outer wall is defined by the flexible wall. By using a filler, a complete closure of the pressure canal, on the basis of the Venturi effect, is easier to achieve. In the structuring of this form of embodiment, caution must naturally be taken that no bypass is produced through the ring chamber canal 18, by way of which the pressure shock could be transferred past the constriction 16 to the pressure measuring cell. Examples of materials for the elastic wall segments are annular membranes made of VA (as in the case of diaphragm seals), or also annular membranes made of elastomers (NBR, Viton, etc.).

In order to achieve an optimal performance of the overloading protection according to the Venturi effect, it is presently preferred that the segment of the pressure canal with the variable flow cross section has, already in the equilibrium position or in normal measuring operation, a flow resistance which contributes significantly, especially at least 5%, to the total hydraulic resistance of the transfer distance between the pressure chamber and a pressure measuring cell. More preferably, the resistance in this segment provides at least 10% or 20% of the total resistance, and it is especially preferred when the resistance in the segment contributes at least 40% of the total resistance. This criterion results from the following consideration: The more strongly the resistance of the segment with the variable flow cross section influences the total resistance of the flowing system, the more effective its controlling of properties on the basis of the Venturi effect. If, at another location, a considerably larger flow resistance is provided which limits the flow velocity in the Venturi protection, then, in this way, the Venturi effect could be limited, or completely stopped.

The invention claimed is:

1. A pressure pickup for registering a pressure, comprising:
 a separating membrane; and
 a platform, wherein: said separating membrane is secured to said platform pressure-tightly, such that a pressure chamber is formed between the platform and the separating membrane, wherein a pressure canal extending from said pressure chamber;
 said pressure chamber and said pressure canal are filled with a hydraulic transfer liquid; and
 said pressure canal has at least one segment whose flow cross section is variable, wherein:
 said variable flow cross section of said at least one segment depends on the velocity of the transfer medium in said at least one segment.

2. The pressure pickup as claimed in claim 1, wherein:
 said at least one segment of said pressure canal with a variable flow cross section is arranged in the entry region of said pressure canal.

3. The pressure pickup as claimed in claim 1, wherein:
 said at least one segment with a variable flow cross section has an annular canal between an inner wall and an outer wall.

4. The pressure pickup as claimed in claim 3, wherein:
 the flow cross section of said annular canal can be changed via relative shifting of the axial position of said inner wall with respect to said outer wall.

5. The pressure pickup as claimed in claim 4, wherein:
 said inner wall of said annular canal comprises a projection of said separating membrane.

6. The pressure pickup as claimed in claim 4, wherein:
 an axially movable filler is arranged in said pressure canal, and said inner wall of said annular canal is formed by the filler.

7. The pressure pickup as claimed in claim 6, further comprising:
 an elastic element, wherein:
 an equilibrium position of said filler relative to said platform is defined by means of said elastic element.

8. The pressure pickup as claimed in claim 3, wherein:
 said inner and outer walls of said annular canal are at least sectionally conical.

9. The pressure pickup as claimed in claim 1, wherein:
 said at least one segment with variable flow cross section has an elastically deformable wall.

10. The pressure pickup as claimed in claim 9, wherein:
 said elastically deformable wall is the outer wall segment of said pressure canal.

11. The pressure pickup as claimed in claim 10, wherein:
 said elastically deformable wall is surrounded by a ring-chamber, which communicates with said pressure chamber.

12. The pressure pickup as claimed in claim 9, wherein:
 said elastically deformable wall is the inner wall of an annular canal.

13. The pressure pickup as claimed in claim 1, further comprising:
 a pressure measuring cell, wherein:
 during measuring operation in the nominal range of said pressure sensor, said segment with variable flow cross section provides at least 10% of the flow resistance of the hydraulic path between said pressure chamber and said pressure measuring cell, which is loaded with the measuring pressure via the hydraulic path.

* * * * *